United States Patent Office 2,911,409
Patented Nov. 3, 1959

2,911,409

2-SPIRO-SUBSTITUTED PYRROLIDINES

Robert B. Moffett, Kalamazoo, Mich., assignor to The Upjohn Company, Kalamazoo, Mich., a corporation of Michigan No Drawing. Application July 18, 1955
Serial No. 522,847

7 Claims. (Cl. 260—313)

This invention relates to novel pyrrolidines, more particularly 2-spiro-substituted pyrrolidines, to a process for their production, and to novel physiologically active amines produced therefrom.

It is an object of the present invention to provide novel 2-spiro-substituted pyrrolidines. Another object is the provision of a process for their production. A further object is the provision of novel physiologically active amines produced therefrom. Other objects will be apparent to those skilled in the art to which this invention pertains.

The novel 2-spiro-substituted pyrrolidines and intermediates in the production thereof may be represented by the following formulae:

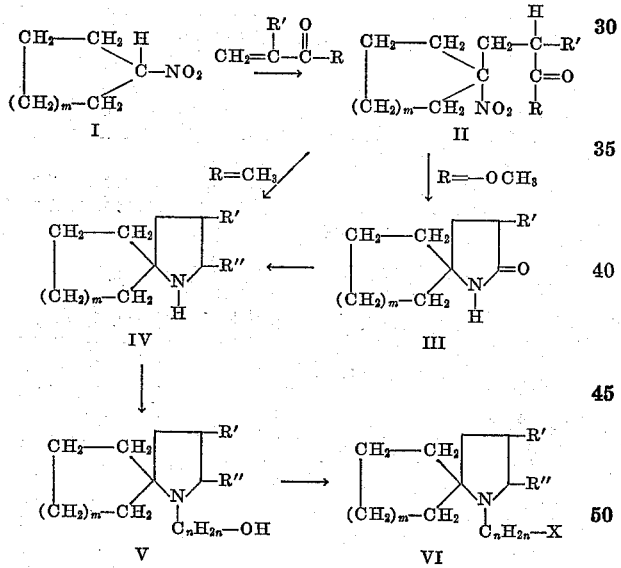

wherein $m$ is a whole number from one to two, inclusive, $n$ is a whole number from two to six, inclusive, R is lower-alkoxy, preferably methoxy, or ethoxy, or methyl, R' and R'' are hydrogen or methyl, and X is a halogen having an atomic weight from 35 to 127, inclusive, i.e., chlorine, bromine, or iodine. In Formulae V and VI, $-C_nH_{2n}-$ is an alkylene group which may be straight chain or branched and which has at least two carbon atoms between the valences. The novel 2-spiro-substituted pyrrolidines of the present invention are represented by Formulae IV, V and VI.

The novel compounds of the present invention, i.e., compounds represented by Formulae IV, V and VI, may collectively be represented by the following formula:

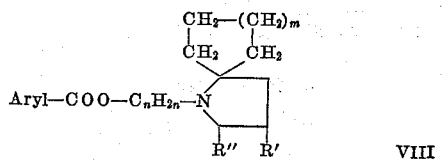

wherein R''' is hydrogen, ω-hydroxyalkyl of the formula $-C_nH_{2n}-OH$ or ω-haloalkyl of the formula $-C_nH_{2n}-X$, with R', R'', $m$, $n$, X and $-C_nH_{2n}-$ having the values given hereinbefore.

The compounds of the present invention are useful as intermediates in the production of a variety of physiologically active compounds. For example, the 2-spiro-pyrrolidyl-alkanols (V) of the present invention can be esterified with an aryl acid chloride or bromide in benzene or other inert solvent to produce local anesthetics of the following formula:

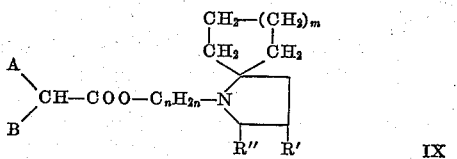

wherein Aryl is an aryl radical, e.g., phenyl, p-biphenylyl, tolyl, xylyl, p-aminophenyl, p-propoxyphenol, o,o'-dimethyl-p-propoxyphenyl, etc., or they can be esterified with a disubstituted acetic acid chloride or bromide in benzene or other inert solvent to produce antispasmodics and antisecretory agents having the following formula:

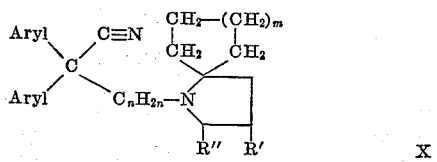

wherein A and B are alike or different and are lower-alkyl, cycloalkyl, cycloalkenyl, or Aryl as defined above, e.g., the substitutions of the disubstituted acetic acids described by Kolloff et al., J. Am. Chem. Soc., 70, 3862 (1948); ibid., 72, 1650 (1950); and U.S. Patent 2,655,511.

The 2-spiro-pyrrolidyl alkyl halides of the present invention can be condensed with an alkali-metal salt of an α,α-diaryl-substituted acetonitrile, e.g., in the manner described hereinafter, to produce a pyrrolidylalkyl-α,α-diaryl-acetonitrile of the following formula:

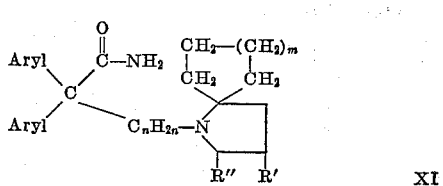

These nitriles can be converted to compounds having antispasmodic, antisecretory and/or diuretic activity by hydrolysis with hydrated concentrated sulfuric acid, e.g., in the manner described hereinafter, to produce α,α-diaryl-ω-pyrrolidylalkyl-acetamides having the following formula:

In Formulae X and XI, Aryl has the value given hereinbefore. Other antispasmodics, antisecretory agents, oxytocics, and diuretics having the formula represented by Formula XI except that one or both of the hydrogen atoms attached to the amido nitrogen are replaced by a lower-alkyl group, e.g., methyl or ethyl, can be prepared by alkylating an α,α-diaryl-N-alkylacetamide or α,α-diaryl-N,N-dialkylacetamide, e.g., in the manner disclosed hereinafter, with a 2-spiro-substituted-pyrrolidyl-alkyl halide (VI) of the present invention or by one of the methods described in the application of Aspergren, Moffett and Speeter, Ser. No. 516,764, filed June 20, 1955, e.g., by alkylation with an alkyl halide of an amide represented by Formula XI.

The 2-spiro-substituted-pyrrolidyl-alkyl halides (VI) and the 2-spiro-substituted-pyrrolidines (IV) of the present invention can be reacted with phenothiazines and 10-(ω-haloalkyl)-phenothiazines, respectively, according to techniques described hereinafter and in U.S. 2,645,640, to produce drug potentiators, tranquilizers and/or antihistamines having the following formula:

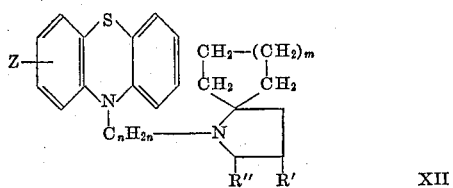

XII wherein Z is hydrogen or a ring substituent, e.g., fluorine, chlorine, bromine, alkoxy, methoxy, methyl, nitro, amino, etc. In Formulae VIII, IX, X, XI, and XII, $m$, $n$, $R'$, $R''$ and $—C_nH_{2n}—$ have the values given hereinbefore.

The compounds represented by Formulae VIII to XII, inclusive, are usually administered orally, preferably as an acid addition salt, e.g., hydrochloride, hydrobromide, hydriodide, sulfate, citrate, acetate, succinate, nitrate, as a quaternary ammonium salt, e.g., methobromide, methiodide, ethochloride, or as an N-oxide (prepared by oxidation of these compounds with a peracid or hydrogen peroxide) and acid addition salts thereof, etc., in the form of tablets, stable aqueous solutions, elixirs, etc.

The process of the present invention involves the conversion of a nitrocycloalkane (I) to a spiro-substituted-pyrrolidine (IV). In carrying out the first step of this conversion, a nitrocycloalkane (I) is condensed with an olefinic compound, preferably an alkyl acrylate, represented by the following formula:

$$CH_2=\overset{R'}{\underset{}{C}}-\overset{O}{\underset{}{C}}-R$$

wherein R and R' have the values given hereinbefore and especially wherein R is lower-alkoxy, preferably methoxy or ethoxy, and R' is hydrogen, to produce a 1-(β-carbonylethyl)-nitrocycloalkane represented by Formula II. The reaction conditions described by Moffett and White, J. Org. Chem., 17, 407 (1952) can be employed using a condensing catalyst, preferably aqueous benzyltrimethylammonium hydroxide, sodium hydroxide, potassium hydroxide, or other strong base. Other bases, e.g., piperidine, pyrrolidine, morpholine, can also be used. The resulting product (II) can then be isolated and purified, e.g., in the manner described hereinafter, or the reaction mixture freed of solvent and used without isolation in the subsequent reduction reaction.

In the reduction step of the present invention, a compound represented by Formula II is reductively cyclized to produce a spiro-pyrrolidine (IV) when R is methyl or a spiro-pyrrolidone (III) when R is lower-alkoxy. In the former case, the cyclization is accomplished with hydrogen and a hydrogenation catalyst, e.g., Raney nickel, etc. In the latter case, the hydrogenation is accomplished by hydrogenation with a suitable catalyst, e.g., in the manner described by Moffett and White (loc. cit.) and as described hereinafter, or by chemical means, e.g., zinc or iron in the presence of acid.

The conversion of a spiropyrrolidone (III) to a spiropyrrolidine (IV) can be accomplished with lithium aluminum hydride, or other chemical reducing agent capable of reducing a pyrrolidone to a pyrrolidine, or by high pressure hydrogenation according to techniques known in the art.

The alkylation of a spiropyrrolidine (IV) to an N-ω-hydroxyalkyl-spiropyrrolidine (V) of the present invention can be accomplished by heating a spiropyrrolidine (IV) with a halohydrin, e.g., ethylene chlorohydrin, ethylene, bromohydrin, propylene chlorohydrin, trimethylene chlorohydrin, etc., an alkylene oxide, e.g., ethylene oxide, propylene oxide, in the presence or absence of a solvent, or a halo ester followed by reduction of the thus-produced pyrrolidyl alkanoic acid ester with lithium aluminum hydride, e.g., according to methods known in the art [Moffett, J. Org. Chem., 14, 862 (1949) and previous papers referred to therein], to produce a 2-spiro-substituted-pyrrolidyl-alkanol (V) of the present invention. Examples of these alkanols include those represented by Formula V wherein the pyrrolidyl substituted alkanol group is ethanol, propanol, 1-methylethanol, 2-methylethanol, 1-methylpropanol, 2-methylpropanol, 3-methylpropanol, 1,2-dimethylethanol, 1,2-dimethylpropanol, 1,3-dimethylpropanol, 2,3-dimethylpropanol and 1,2,3-trimethylpropanol, butanol, pentanol, hexanol, 2,3-dimethylbutanol, 1-methylpentanol, etc. group.

These pyrrolidylalkanols (V) can then be reacted with thionyl bromide, thionyl chloride, phosphorous tribromide, phosphorus trichloride, etc., to produce acid addition salts of pyrrolidyl-alkyl halides (VI) of the present invention, e.g., wherein the alkyl group is that of an alkanol named above and the hydroxy group has been replaced by a chlorine or bromine atom, e.g., in the manner described hereinafter and by Moffett et al., J. Am. Chem. Soc., 77, 1565 (1955).

The following preparations and examples are illustrative of the process and products of the present invention but are not to be construed as limiting.

*Example 1A.—Methyl β-(1-nitrocyclohexyl) propionate*

In a one-liter, 3-necked flask fitted with stirrer, dropping funnel and thermometer were placed 333 grams (2.55 moles) of nitrocyclohexane (technical grade, redistilled), 300 milliliters of dioxane (lithium aluminum hydride-treated and redistilled) and thirty milliliters of a 35 percent methanolic solution of benzyltrimethylammonium hydroxide. To the resulting stirred mixture was added 227.5 grams (2.55 moles) of methyl acrylate (redistilled) over a period of fifteen minutes, during which time the temperature rose to about 100 degrees centigrade. When the temperature had dropped to about 55 degrees centigrade, the mixture was heated on a steam bath with stirring for three hours and then maintained at room temperature for about eighteen hours. The mixture was then diluted with about one liter of ether, acidified with dilute hydrochloric acid, extracted twice with a saturated aqueous sodium chloride solution, then with an aqueous sodium chloride solution containing a little sodium bicarbonate and finally with saturated aqueous sodium chloride solution. The organic layer was separated, dried and distilled through a Vigreux column. There was thus obtained 523.3 grams, a yield of 96.8 percent of the theoretical, of methyl β-(1-nitrocyclohexyl)-propionate distilling at between 96.5 degrees centigrade at a pressure of 0.05 millimeter of mercury absolute to 124.5 degrees at a pressure of 0.35 millimeter and having an $n_D^{25}$ of 1.4710. A sample was redistilled through a six-inch, helice-packed column to give a fraction boiling at 96 degrees centigrade at 0.025 millimeter pressure and having the analysis below.

Calculated for $C_{10}H_{17}NO_4$: C, 55.80; H, 7.96; N, 6.51. Found: C, 56.05; H, 8.02; N, 6.48.

*Example 1B.—Spiro[cyclohexane-1,2'-pyrrolidone-5']*

A solution of 453.3 grams (2.11 mole) of methyl β-(1-nitrocyclohexyl)-propionate in 1.26 liters of methanol-denatured ethanol (3A) was hydrogenated in the presence of Raney nickel catalyst for eighteen hours at fifty degrees centigrade. The mixture was cooled, filtered and the filtrate distilled to dryness at reduced pressure. The white crystalline residue was dissolved in two liters of boiling methylcyclohexane which was then distilled until about 100 milliliters had been collected, to remove any residual ethanol. The solution was clarified by pressure filtration while hot and then cooled. There was thus obtained 253 grams, a yield of 72 percent of the theoretical, of spiro [cyclohexane-1,2'-pyrrolidone-5'] melting 131 and 133 degrees centigrade. A further 31.4 grams of product melting at 129 to 132 degrees centigrade was obtained by concentration of the mother liquor. A sample recrystallized from Skellysolve B (hexane hydrocarbons) melted at 132 to 133 degrees centigrade and had the analysis below.

Calculated for $C_9H_{15}NO$: N, 9.14. Found: N, 9.03.

The product is a very weak base moderately soluble in water, very soluble in dilute mineral acids and unaffected by boiling twenty percent sodium hydroxide or sulfuric acid.

*Example 1C.—Spiro[cyclohexane-1,2'-pyrrolidine]*

A mixture of 95 grams (2.5 moles) of lithium aluminum hydride and 1.5 liters of tetrahydrofuran (distilled from lithium aluminum hydride) was refluxed with stirring for a few minutes and then a solution of 206 grams (1.343 mole) of spiro[cyclohexane-1,2'-pyrrolidone-5'] dissolved in 1.1 liters of tetrahydrofuran was slowly added. The stirred mixture was then heated at its refluxing temperature for eighteen hours. About two liters of solvent was removed by distillation and the following were slowly added to the residue in succession: one liter of U.S.P. ether, 200 milliliters of ethyl acetate, and one liter of concentrated hydrochloric acid dissolved in 1.5 liters of water. The strongly acidic solution was steam distilled until a distillation temperature of 100 degrees centigrade was reached. To the hot residue was added about 1,760 grams of aqueous fifty percent sodium hydroxide. The mixture was then steam distilled until practically no basic material came over with the distillate. The four liters of basic distillate was extracted twice with about one-liter portions of ether. The extracted aqueous layer was then subjected to continuous extraction with ether for six hours. The combined ether extracts were thoroughly dried with anhydrous potassium carbonate.

This procedure was followed on another run employing 83.5 grams of lithium aluminum hydride, 168.5 grams of spiro[cyclohexane-1,2'-pyrrolidone-5'] and two liters of tetrahydrofuran.

The combined runs were distilled through a twelve-inch column packed with ⅛-inch helices. After the solvent had been removed, the residue was distilled at reduced pressure. There was obtained a 286 gram fraction of spiro[cyclohexane-1,2'-pyrrolidone] distilling at 99 to 104 degrees centigrade at a pressure of 42 millimeters of mercury absolute and having an $n_D^{25}$ of 1.4817 and the analysis below.

Calculated for $C_9H_{17}N$: C, 77.63; H, 12.31; N, 10.06. Found: C, 77.95; H, 11.88; N, 9.24.

*Example 2.—β-Spiro[cyclohexane-1,2'-pyrrolidyl-1']ethanol*

A stirred mixture of 27.84 grams (0.2 mole) of spiro[cyclohexane-1,2'-pyrrolidine] and 16.1 grams (0.2 mole) of ethylene chlorohydrin in a 100-milliliter, round-bottomed flask fitted with a thermometer, reflux condenser and magnetic stirrer was rapidly heated to 120 degrees centigrade. The heat was removed as the mixture spontaneously rose to about 167 degrees centigrade. When the temperature had dropped to 120 degrees centigrade, the flask was again heated at 130 to 150 degrees centigrade for fifteen minutes. The cooled solution was mixed with thirty milliliters of aqueous fifty percent sodium hydroxide and then extracted thoroughly with four portions of ether. The combined ether extracts were dried with potassium carbonate, filtered and the ether removed by distillation. The residue was distilled through a six-inch column packed with ⅛-inch helices. After a forerun of spiro[cyclohexane-1,2'-pyrrolidine] was removed, there was obtained 23.3 grams of β-spiro[cyclohexane-1,2'-pyrrolidyl-1']-ethanol distilling at 138 degrees centigrade at an absolute pressure of twelve millimeters of mercury. A sample taken from the center cut of the distillate had an $n_D^{25}$ of 1.5010 and the analysis below.

Calculated for $C_{11}H_{21}NO$: C, 72.08; H, 11.55; N, 7.64. Found: C, 72.41; H, 11.87; N, 7.66.

β-Spiro[cyclohexane-1,2'-pyrrolidyl-1']-ethanol hydrochloride was prepared by adding an excess of anhydrous hydrogen chloride to a cooled solution of β-spiro[cyclohexane-1,2'-pyrrolidyl-1']-ethanol in benzene. The precipitated, crystalline hydrochloride was filtered. A sample recrystallized from isopropyl alcohol gave spiro[cyclohexane-1,2'-pyrrolidyl-1']-ethanol hydrochloride melting at 177.5 to 179 degrees centigrade and having the analysis below.

Calculated for $C_{11}H_{22}ClNO$: Cl, 16.13. Found: Cl, 16.30.

*Example 3.—γ-Spiro[cyclohexane-1,2'-pyrrolidyl-1']propanol*

Following the procedure of Example 2, but employing 27.84 grams (0.2 mole) of spiro[cyclohexane-1,2'-pyrrolidine] and 18.9 grams (0.2 mole) of trimethylene chlorohydrin, there was thus obtained 23.43 grams of γ-spiro[cyclohexane-1,2'-pyrrolidyl-1']-propanol distilling at 155 degrees centigrade at an absolute pressure of 11.5 millimeters of mercury, having an $n_D^{25}$ of 1.4979 and the analysis below.

Calculated for $C_{12}H_{23}NO$: N, 7.10. Found: N, 7.12.

*Example 4.—β-Spiro[cyclohexane-1,2'-pyrrolidyl-1']ethyl chloride hydrochloride*

A cooled, rapidly stirred solution of 121 grams (0.676 mole) of β-spiro[cyclohexane-1,2'-pyrrolidyl-1']-ethanol in 250 milliliters of benzene was saturated with anhydrous hydrogen chloride gas. Nitrogen was bubbled through the mixture to remove some of the excess hydrogen chloride and the flask then cooled to about zero degrees centigrade. To the cooled solution was slowly added sixty milliliters (0.88 mole) of thionyl chloride. The mixture became homogeneous. The solution was refluxed for two hours, with stirring, during which time the desired product precipitated. The precipitated crystals were filtered and washed with benzene and then with absolute ether to give 158 grams, a yield of 98 percent of the theoretical, of β-spiro[cyclohexane-1,2'-pyrrolidyl-1']-ethyl chloride hydrochloride melting at 239 to 240 degrees centigrade and having the analysis below.

Calculated for $C_{11}H_{21}Cl_2N$: Cl, 29.77. Found: Cl, 29.50.

*Example 5.—γ-Spiro[cyclohexane-1,2'-pyrrolidyl-1']propyl chloride hydrochloride*

Following the procedure described in Example 4, but employing 22.4 grams of γ-spiro[cyclohexane-1,2'-pyrrolidyl-1']-propanol, fifty milliliters of benzene and fifteen milliliters of thionyl chloride, there was thus obtained 26.8 grams of γ-spiro[cyclohexane-1,2'-pyrrolidyl-1']-propyl chloride hydrochloride melting at 224 to 227 degrees centigrade. A sample recrystallized from isopropyl alcohol melted at 225 to 227 degrees and had the analysis below.

Calculated for $C_{12}H_{23}Cl_2N$: Cl, 28.11. Found: Cl, 28.07.

The following examples are illustrative of physiologically active compounds which can be produced from the compounds of the present invention.

β-Spiro[cyclohexane - 1,2' - pyrrolidyl - 1']-ethyl α'-n - propyl - cyclopentane - acetate, hydrochloride and methobromide.—To a solution of 9.33 grams (0.05 mole) of β-spiro[cyclohexane-1,2'-pyrrolidyl-1']-ethanol in fifty milliliters of dry benzene was added 11.3 grams of α-n-propyl-cyclopentane-acetyl chloride [Moffet et al., J. Org. Chem., 15, 343 (1950)]. A white precipitate appeared almost immediately but redissolved on heating the mixture at its refluxing temperature for three hours. The solution was maintained at room temperature for about eighteen hours and then mixed with thirty milliliters of aqueous ten percent sodium hydroxide. The organic layer was extracted thoroughly with ether which was then washed with water. The solution was dried, the ether distilled and the residue distilled at reduced pressure. An 8.34 gram fraction of β-spiro[cyclohexane-1,2'-pyrrolidyl-1']-ethyl α'-n-propyl-cyclopentane-acetate boiling at 146 to 147 degrees centigrade at an absolute pressure of 0.04 millimeter of mercury was obtained.

The product thus-obtained was dissolved in ether and the solution acidified with ethanolic hydrogen chloride. The β-spiro[cyclohexane-1,2'-pyrrolidyl-1']-ethyl α'-n-propyl-cyclopentane-acetate hydrochloride thus-obtained, after separation from the solvent, weighed 8.2 grams, melted at 151 to 152 degrees centigrade and had the analysis below.

Calculated for $C_{21}H_{38}ClNO_2$: C, 67.80; H, 10.30; Cl, 9.53. Found: C, 68.21; H, 10.16; Cl, 9.53.

Additional free base was obtained by making alkaline the filtrate obtained from the filtration of the hydrochloride, separating the precipitated base and mixing it with the high-and low-boiling fractions recovered from the distillation described above and redistilling the whole. There was thus obtained seven grams of β-spiro[cyclohexane-1,2'-pyrrolidyl-1']-ethyl α'-n-propyl-cylopentane-acetate distilling at 146 degrees centigrade at 0.05 millimeter of mercury, and having the analysis below.

Calculated for $C_{21}H_{37}NO_2$: N, 4.17. Found: N, 4.00.

A cold solution of 6.5 grams of β-spiro[cyclohexane-1,2'-pyrrolidyl-1']-ethyl α'-n-propyl-cyclopentane-acetate in 25 milliliters of methyl ethyl ketone was mixed with an excess of cold methyl bromide. The mixture was maintained in a tightly stoppered flask for two days at room temperature. The precipitated β-spiro[cyclohexane - 1,2' - pyrrolidyl - 1'] - ethyl α' - n - propyl - cyclopentane-acetate methobromide, after filtering and drying, weighed 5.06 grams, melted at 152 to 154 degrees centigrade and had the analysis below.

Calculated for $C_{22}H_{40}BrNO_2$: C, 61.38; H, 9.37; Br, 18.57. Found: C, 61.64; H, 9.34; Br, 18.58.

β - Spiro[cyclohexane - 1,2' - pyrrolidyl - 1'] - ethyl α'-phenyl - Δ² - cyclopentene - acetate, hydrochloride and methobromide. — Following the procedure described above for the preparation of β-spiro[cyclohexane-1,2'-pyrrolidyl-1']-ethyl α'-n-propyl-cyclopentane-acetate, but using 11.6 grams of β-spiro[cyclohexane-1,2'-pyrrolidyl-1']-ethanol and 15.5 grams of α-phenyl-Δ²-cyclopentene-acetyl chloride [Horclois, Chemie and Industrie, Special No., pages 357–63 (April 1934)] in fifty milliliters of dry benzene, there was obtained 22.17 grams, a yield of 95 percent of the theoretical, of β-spiro[cyclohexane-1,2'-pyrrolidyl - 1'] - ethyl α' - phenyl - Δ² - cyclopentene-acetate boiling at 163 degrees centigrade at an absolute pressure of 0.01 millimeter of mercury and having the analysis below.

Calculated for $C_{24}H_{33}NO_2$: C, 78.43; H, 9.05; N, 3.81. Found: C, 78.80; H, 8.88; N, 3.84.

A solution of 16.3 grams of the free base obtained as described above in dry ether was acidified with ethanolic hydrogen chloride. An oil was obtained which crystallized from ethyl acetate to give 12.7 grams of β-spiro[cyclohexane - 1,2' - pyrrolidyl - 1'] - ethyl α' - phenyl-Δ²-cylopentene-acetate hydrochloride melting at 140 to 142 degrees centigrade and having the analysis below.

Calculated for $C_{24}H_{34}ClNO_2$: C, 71.33; H, 8.48; Cl, 8.78. Found: C, 71.31; H, 8.37; Cl, 8.96.

A cold solution of 4.55 grams of the free base obtained as described above in 25 milliliters of methyl ethyl ketone was mixed with five grams of cold methyl bromide. The tightly stoppered flask was maintained at room temperature for five days. The white crystals of β-spiro[cyclohexane - 1,2' - pyrrolidyl - 1'] - ethyl α' - phenyl-Δ²-cyclopentene-acetate methobromide were separated and, after washing with methyl ethyl ketone and then with absolute ether, weighed five grams and melted at 167.5 to 169 degrees centigrade and had the analysis below.

Calculated for $C_{25}H_{36}BrNO_2$: C, 64.92; H, 7.85; Br, 17.28. Found: C, 65.01; H, 7.98; Br, 17.49.

β-Spiro[cyclohexane-1,2'-pyrrolidyl-1']-ethyl α'-phenyl-cyclopentane-acetate hydrochloride.—A solution of 9.47 grams (0.0234 mole) of β-spiro[cyclohexane-1,2'-pyrrolidyl-1']-ethyl α'-phenyl-Δ²-cyclopenteneacetate hydrochloride in 150 milliliters of 95 percent ethanol was hydrogenated at room temperature at a pressure of forty pounds in excess of atmospheric in the presence of 0.1 gram of platinum oxide catalyst. The theoretical amount of hydrogen was absorbed within ten minutes. The solution was filtered and the filtrate distilled nearly to dryness below forty degrees centigrade at reduced pressure. The residue was dissolved in ethyl acetate and recrystallized therefrom by the addition of ether. The white crystalline precipitate was filtered, washed with ether and dried to give 7.88 grams of β-spiro[cyclohexane-1,2'-pyrrolidyl-1']-ethyl α'-phenyl-cyclopentane-acetate hydrochloride melting at 152 to 153.5 degrees centigrade and having the analysis below.

Calculated for $C_{24}H_{36}ClNO_2$: C, 70.99; H, 8.94; Cl, 8.73. Found: C, 71.21; H, 8.88; Cl, 8.77.

α,α-Diphenyl-γ-(spiro[cyclohexane-1,2'-pyrrolidyl-1'])-butyronitrile and hydrochloride.—A vigorously stirred mixture of 38.6 grams of diphenylacetonitrile, 5.06 grams of lithium amide and 300 milliliters of dry toluene was refluxed in a nitrogen atmosphere for four hours. To this solution was added dropwise over a period of thirty minutes 0.22 mole of spiro[cyclohexane-1,2'-pyrrolidyl-1']-ethyl chloride in dry toluene.

The solution of the chloride was prepared by mixing 85.9 grams of the corresponding hydrochloride salt with toluene, ice and 35 milliliters of aqueous fifty percent sodium hydroxide, extracting thoroughly with toluene, drying the toluene and making up the solution to 400 milliliters with dry toluene. A 244.5 milliliter aliquot of this solution contained the required 0.22 mole of chloride.

The stirred mixture of the chloride and the lithium salt of diphenyl-acetonitrile was heated at its refluxing temperature for nineteen hours. The cooled mixture was washed with water which was then extracted with ether. The ether extracts and toluene layer were combined and shaken with a solution of forty milliliters of hydrochloric acid diluted to 300 milliliters with water. The resulting hydrochloride of α,α-diphenyl-γ-(spiro[cyclohexane-1,2'-pyrrolidyl-1'])-butyronitrile separated as a layer insoluble in water and the organic layer. The aqueous and hydrochloride layers were separated from the solvent layer, washed well with ether and then made basic with dilute sodium hydroxide. The oily free base separated and was extracted with ether and benzene. The combined ether and benzene solutions were washed with water, dried and the solvent distilled. The residue was distilled from a Claisen flask to give 46.3 grams of α,α-diphenyl - γ - (spiro[cyclohexane - 1,2' - pyrrolidyl - 1'])- butyronitrile as a viscous liquid, distilling at 160 degrees centigrade in an absolute pressure of 0.02 millimeter of mercury, which crystallized on standing. These crystals, when crystallized once from isopropyl alcohol, melted at 85 to ninety degrees centigrade and when crystallized again from the same solvent, melted at ninety to 92 degrees centigrade and had the analysis below.

Calculated for $C_{25}H_{30}N_2$: C, 83.75; H, 8.44; N, 7.82. Found: C, 83.95; H, 8.45; N, 7.80.

The moist toluene-ether layer from which the hydrochloride precipitated as an oil gradually deposited 5.56 grams of a dihydrate of α,α-diphenyl-γ-(spiro[cyclohexane - 1,2' - pyrrolidyl - 1']) - butyronitrile hydrochloride which, on slow heating in a capillary tube melted with foaming at 123 to 128 degrees centigrade, recrystallized and then remelted at 195 to 197 degrees centigrade and had an analysis correct for $C_{25}H_{31}ClN_2 \cdot 2H_2O$. A thoroughly dried sample had the analysis below.

Calculated for $C_{25}H_{31}ClN_2$: C, 76.01; H, 7.91. Found: C, 75.74; H, 8.04.

*α,α-Diphenyl - γ - (spiro[cyclohexane - 1,2' - pyrrolidyl-1'])-butyramide, hydrochloride and methobromide.*—A solution of 32.8 grams of α,α-diphenyl-γ-(spiro[cyclohexane-1,2'-pyrrolidyl-1'])-butyronitrile and 5.5 milliliters of concentrated sulfuric acid in 55 milliliters of water was heated with stirring on a steam bath for four hours. The mixture was maintained at room temperature for eighteen hours and then poured onto ice. The gummy precipitate of the sulfate dissolved in the aqueous layer when ether was added. The aqueous layer was washed with ether and then made alkaline with ammonium hydroxide. The resulting oily precipitate soon crystallized and was filtered, washed with water and dried to give 36.2 grams of α,α-diphenyl-γ-(spiro[cyclohexane-1,2'-pyrrolidyl-1'])-butyramide melting at 164 to 168 degrees centigrade. Recrystallization from eighty percent ethanol raised the melting point to 169.5 to 172 degrees centigrade. The product had the analysis below.

Calculated for $C_{25}H_{32}N_2O$: C, 79.74; H, 8.57; N, 7.44. Found: C, 79.84; H, 8.32; N, 7.40.

A solution of 6.5 grams of α,α-diphenyl-γ-(spiro[cyclohexane-1,2'-pyrrolidyl-1'])-butyramide in methanol and 1.6 milliliters of concentrated aqueous hydrochloric acid was evaporated on a stream of nitrogen. Benzene was added to the residue which was also evaporated to a small volume. On cooling there was obtained 7.3 grams of α,α - diphenyl - γ - (spiro[cyclohexane - 1,2' - pyrrolidyl-1'])-butyramide hydrochloride melting at 214 to 215.5 degrees centigrade. A sample recrystallized from dimethyl-formamide had a melting point of 212.5 to 214.5 degrees centigrade and the analysis below.

Calculated for $C_{25}H_{33}ClN_2O$: C, 72.70; H, 8.05; Cl, 8.59. Found: C, 72.77; H, 8.12; Cl, 8.63.

A cold suspension of 7.53 grams of α,α-diphenyl-γ-(spiro[cyclohexane-1,2'-pyrrolidyl-1'])-butyramide in fifty milliliters of methanol was mixed with sixteen grams of cold methyl bromide. The mixture, in a tightly stoppered flask, was maintained at room temperature for four days, during which time the solution became homogeneous. The solvent was partially removed from the solution by distillation and ether was added to the concentrate, thus precipitating the gum. The gum was dissolved in methanol, the solution filtered, the methanol partially removed by distillation and the concentrate diluted with methyl ethyl ketone. The solution was boiled on a steam bath whereupon crystals of α,α-diphenyl-γ-(spiro[cyclohexane-1,2'-pyrrolidyl-1'])-butyramide methobromide precipitated which, when dried, weighed 8.84 grams, melted at 200 to 202 degrees centigrade, and had the analysis below.

Calculated for $C_{26}H_{35}BrN_2O$: C, 66.23; H, 7.48; Br, 16.95. Found: C, 66.14; H, 7.52; Br, 16.56.

*α,α - Diphenyl-γ-(spiro[cyclohexane-1,2'-pyrrolidyl-1'])-N-methylbutyramide hydrochloride.*—A suspension of 8.28 grams (0.022 mole) of α,α-diphenyl-γ-(spiro[cyclohexane-1,2'-pyrrolidyl-1'])-butyramide and 0.97 gram (0.025 mole) of sodium amide in 75 milliliters of dry toluene was heated at its refluxing temperature for two hours. The solution was cooled at about zero degrees centigrade and a solution of 2.3 grams (0.024 mole) of methyl bromide in 35 milliliters of cold toluene was added dropwise with stirring over a period of thirty minutes. The mixture was maintained at room temperature for about 22 hours and then extracted with dilute hydrochloric acid and the aqueous solution washed with ether. The washed aqueous solution was made basic with sodium hydroxide thereby precipitating the oily free base which was extracted with ether. The ether solution was washed with water, the ether distilled and the residue mixed with benzene which was also distilled to remove the water. The residual gum was dissolved in ether and the solution made slightly acidic with ethanolic hydrogen chloride. The hydrochloride precipitated as a gum which crystallized on standing. Recrystallization of these crystals from methyl ethyl ketone gave 5.95 grams of α,α-diphenyl-γ-(spiro[cyclohexane-1,2'-pyrrolidyl-1'])-N-methylbutyramide hydrochloride melting at 186 to 188 degrees centigrade and having the analysis below. The infrared absorption spectrum was consistent with the structure.

Calculated for $C_{26}H_{35}ClN_2O$: C, 73.13; H, 8.26; Cl, 8.30. Found: C, 73.29; H, 7.96; Cl. 8.33.

*α,α - Diphenyl-γ-(spiro[cyclohexane-1,2'-pyrrolidyl-1'])-N,N-dimethylbutyramide, hydrobromide and methobromide.*—A stirred mixture of 14.4 grams (0.06 mole) of diphenyl-N,N-dimethylacetamide [Gokhale et al., J. Univ. Bombay, 16, No. 5, 32–36 (1948)], 2.65 grams (0.068 mole) of sodium amide and 100 milliliters of dry toluene was refluxed in a nitrogen atmosphere for two hours. After cooling, 72.2 milliliters of a solution of 0.065 mole of spiro[cyclohexane-1,2'-pyrrolidyl-1']-ethyl chloride in dry toluene (prepared as described above) was added in a dropwise fashion over a period of thirty minutes. The mixture was then maintained at its refluxing temperature for one hour and then at room temperature for about eighteen hours. The mixture was washed with water and the water then extracted with ether. The combined ether and toluene solutions were extracted with dilute hydrochloric acid which was then extracted with ether and finally made basic with sodium hydroxide. The free base separated as a gum which soon crystallized to give 23.7 grams of α,α-diphenyl-γ-(spiro[cyclohexane-1,2'-pyrrolidyl-1']) - N,N-dimethylbutyramide melting, in its crude state, at 133 to 145 degrees centigrade; after one crystallization from isopropyl alcohol, at 147 to 152 degrees centigrade; and after a second crystallization from benzene, at 149 to 152 degrees centigrade and had the analysis below.

Calculated for $C_{27}H_{36}N_2O$: C, 80.15, H, 8.97; N, 6.93. Found: C, 80.44; H, 8.93; N, 6.87.

The filtrates from the above crystallizations were acidified with 48 percent hydrobromic acid and then concentrated by distillation of the solvent. Ether was added to the concentrate to give a gum which solidified on standing. The solid was crystallized first from a mixture of methyl ethyl ketone and acetone and then from methyl ethyl ketone to give white crystals of an acetone solvate of α,α-diphenyl-γ-(spiro[cyclohexane - 1,2' - pyrrolidyl - 1']) - N,N - dimethylbutyramide hydrobromide melting at about 103 to 110 degrees centigrade with decomposition. That this hydrobromide was obtained as a solvate with acetone was established by dissolving a 0.1 gram sample in ethanol containing 2,4-dinitrophenylhydrozine (Shriner and Fusion, "Identification of Organic Compounds," third edition, page 171) to obtain acetone 2,4-dinitrophenylhydrozone. The hydrobromide analyzed correctly for an equimolar solvate with acetone.

Calculated for $C_{27}H_{37}BrN_2O \cdot CH_3COCH_3$: C, 66.28; H, 7.97; Br, 14.70. Found: C, 66.48; H, 7.77; Br, 14.59.

To a cold suspension of 8.09 grams (0.02 mole) of

α,α-diphenyl-γ-(spiro[cyclohexane-1,2'-pyrrolidyl-1'])-N,N-dimethylbutyramide in 25 milliliters of acetone and forty milliliters of methanol was added ten grams of cold methyl bromide. The tightly stoppered flask was maintained at room temperature for three days. The resulting solution was concentrated by heating on a steam bath in an atmosphere of nitrogen to give an oil which crystallized on standing. The solid was triturated with absolute ether, filtered and dried to give white crystals which, when crystallized from methanol, gave 9.85 grams, a yield of 98 percent of the theoretical, of α,α-diphenyl-γ-(spiro[cyclohexane-1,2'-pyrrolidyl-1'])-N,N-dimethylbutyramide methobromide melting at 191 to 193 degrees centigrade and having the analysis below.

Calculated for $C_{28}H_{39}BrN_2O$: C, 67.32; H, 7.87; Br, 16.00. Found: C, 67.12; H, 8.09; Br, 16.06.

*10-(β-spiro[cyclohexane-1,2'-pyrrolidyl-1']-ethyl) phenothiazine hydrochloride hydrate.*—A stirred mixture of fourteen grams (0.07 mole) of phenothiazine, 100 milliliters of dry toluene, and 2.93 grams (0.075 mole) of sodium amide was heated in a nitrogen atmosphere for two hours at its refluxing temperature. To the cooled vigorously stirred solution was added dropwise, over a period of fifteen minutes, a solution of 83.3 milliliters of a solution of 0.075 mole of β-(spiro[cyclohexane-1,2'-pyrrolidyl-1'])-ethyl chloride in toluene. The resulting mixture was heated at its refluxing temperature for nineteen hours, cooled, washed with water and then shaken with 400 milliliters of water containing fifteen milliliters of concentrated hydrochloric acid. An oil separated which soon crystallized. The solid was collected, washed with water, ether and then dried to give 26.8 grams of tan crystals of 10-(β-spiro[cyclohexane-1,2'-pyrrolidyl-1']-ethyl)-phenothiazine hydrochloride hydrate melting at 107 to 130 degrees centigrade with decomposition. These crystals, when recrystallized from water, gave 25.7 grams, a yield of 77.5 percent of the theoretical, of product melting at 120 to 130 degrees centigrade with decomposition and having the analysis below.

Calculated for $C_{23}H_{29}ClN_2S \cdot H_2O$: C, 65.93; H, 7.46; N, 6.69; Cl, 8.46; S, 7.65. Found: C, 66.10; H, 7.59; N, 6.47; Cl, 8.54; S, 7.96.

*2-chloro-10-(γ-spiro[cyclohexane-1,2'-pyrrolidyl-1']-propyl)-phenothiazine.*—A stirred mixture of 11.7 grams (0.05 mole) of 2-chlorophenothiazine, 2.06 grams (0.053 mole) of sodium amide and 75 milliliters of dry toluene was heated in a nitrogen atmosphere at its refluxing temperature for two hours. A dried solution of γ-(spiro[cyclohexane-1,2'-pyrrolidyl-1'])-propyl chloride in toluene (prepared by mixing 13.4 grams of γ-(spiro[cyclohexane-1,2'-pyrrolidyl-1'])-propyl chloride hydrochloride in water with nine milliliters of aqueous fifty percent sodium hydroxide and then extracting with about 100 milliliters of toluene), was slowly added to the cooled vigorously stirred solution of the sodium salt of 2-chlorophenothiazine. The mixture was heated at its refluxing temperature for eight hours and then maintained at room temperature for eighteen hours. The mixture was washed twice with water which was then extracted with ether. The combined toluene and ether solutions were shaken with dilute hydrochloric acid. An oily insoluble hydrochloride precipitated. The combined aqueous and hydrochloride layers were washed with ether and then made alkaline with sodium hydroxide. The oily free base which precipitated soon crystallized. The solid was filtered, washed with water and dried to give 2-chloro-10-(γ-spiro[cyclohexane-1,2'-pyrrolidyl-1']-propyl)-phenothiazine melting at 108 to 112 degrees centigrade and, after decolorization with activated charcoal and crystallization from ethyl acetate, melting at 114 to 116 degrees centigrade and having the analysis below.

Calculated for $C_{24}H_{29}ClN_2S$: C, 69.79; H, 7.08; Cl, 8.58. Found: C, 69.83; H, 7.08; Cl, 8.21; 8.78.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. Spiro[cyclohexane-1,2'-pyrrolidyl-1']-ethanol of the formula

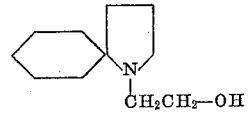

2. Spiro[cyclohexane-1,2'-pyrrolidyl-1']-propanol of the formula

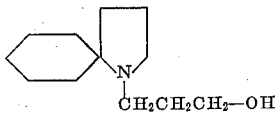

3. Spiro[cyclohexane-1,2'-pyrrolidyl-1']-ethyl chloride hydrochloride of the formula

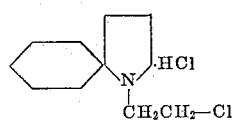

4. Spiro[cyclopentane-1,2'-pyrrolidine] of the formula

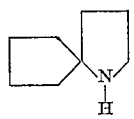

5. A compound selected from the group consisting of (1) 2-spiro-pyrrolidines represented by the following formula:

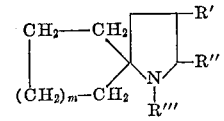

wherein R''' is an ω-hydroxy alkyl of the formula —$C_nH_{2n}$—OH wherein —$C_nH_{2n}$— is an alkylene radical having at least two carbon atoms between the valences and $n$ is a whole number from two to six, inclusive; R' and R'' are selected from the group consisting of hydrogen and methyl; and $m$ is a whole number from one to two, inclusive; and (2) acid addition salts thereof.

6. A compound selected from the group consisting of (1) 2-spiro-pyrrolidines represented by the following formula:

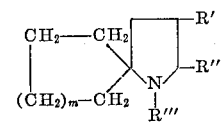

wherein R''' is an ω-haloalkyl of the formula

—$C_nH_{2n}$—X wherein X is a halogen having an atomic weight from 35 to 127, inclusive, —$C_nH_{2n}$— is an alkylene radical having at least two carbon atoms between the valences, and $n$ is a whole number from two to six, inclusive; R' and R'' are selected from the group consisting of hydrogen and methyl; and $m$ is a whole number from one to two, inclusive; and (2) acid addition salts thereof.

7. A compound selected from the group consisting of (1) 2-spiro-cyclopentane pyrrolidines represented by the following formula:

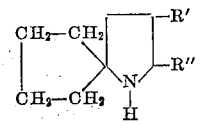

wherein R' and R" are selected from the group consisting of hydrogen and methyl, and (2) acid addition salts thereof.

References Cited in the file of this patent

FOREIGN PATENTS

| | | |
|---|---|---|
| 487,869 | Canada | Nov. 11, 1952 |
| 880,400 | France | Dec. 28, 1942 |
| 57,433 | Netherlands | Aug. 16, 1945 |
| 227,125 | Switzerland | May 31, 1943 |

OTHER REFERENCES

Jour. Org. Chem., vol. 17, pp. 407–413 (1952).

Vestnik: Moskov Univ. 9, #9, Ser. Fiz.—Mat. i. Estestven. Nauk No. 6, pp. 115–118, January 7, 1954 cited in Chem. Abstracts, vol. 49, p. 15856 (1955).